(12) United States Patent
Yogita et al.

(10) Patent No.: US 9,758,946 B2
(45) Date of Patent: Sep. 12, 2017

(54) WORK VEHICLE

(71) Applicant: KOMATSU LTD., Tokyo (JP)

(72) Inventors: Jin Yogita, Hirakata (JP); Eiji Morinaga, Hirakata (JP); Kozo Okuda, Hirakata (JP); Kazuyoshi Morimoto, Hirakata (JP)

(73) Assignee: KOMATSU LTD., Tokyo (JP)

( * ) Notice: Subject to any disclaimer, the term of this patent is extended or adjusted under 35 U.S.C. 154(b) by 202 days.

(21) Appl. No.: 14/372,108

(22) PCT Filed: Feb. 26, 2014

(86) PCT No.: PCT/JP2014/054763
§ 371 (c)(1),
(2) Date: Jul. 14, 2014

(87) PCT Pub. No.: WO2014/185117
PCT Pub. Date: Nov. 20, 2014

(65) Prior Publication Data
US 2015/0240454 A1  Aug. 27, 2015

(51) Int. Cl.
*E02F 9/20* (2006.01)
*F02D 41/02* (2006.01)
(Continued)

(52) U.S. Cl.
CPC .............. *E02F 9/2066* (2013.01); *E02F 3/32* (2013.01); *E02F 9/0866* (2013.01);
(Continued)

(58) Field of Classification Search
CPC .. F01N 11/00; F01N 2610/02; F01N 2550/05; F01N 2550/00; F01N 2570/14;
(Continued)

(56) References Cited

U.S. PATENT DOCUMENTS

2002/0104311 A1    8/2002  Nishiyama
2006/0086080 A1*   4/2006  Katogi ................... F01N 3/035
                                                        60/278
(Continued)

FOREIGN PATENT DOCUMENTS

CN    101037869 A    9/2007
CN    102770605 A    11/2012
(Continued)

*Primary Examiner* — Sizo Vilakazi
(74) *Attorney, Agent, or Firm* — Drinker Biddle & Reath LLP

(57) ABSTRACT

A work vehicle having a plurality of working modes allowing working in accordance with a load state includes an engine, an exhaust gas purification apparatus, a reducing agent tank, a state determination portion, and an engine control unit. The exhaust gas purification apparatus purifies a nitrogen oxide in an exhaust gas. The reducing agent tank stores a reducing agent. The state determination portion determines a state of the reducing agent. The engine control unit controls output of the engine with the use of a restricted-operation engine output torque curve in which horsepower output from the engine is lower than horsepower output from the engine at the time when each of the plurality of working modes is selected, when a state of the reducing agent is equal to or lower than a reference value.

6 Claims, 9 Drawing Sheets

(51) Int. Cl.
  *E02F 9/22* (2006.01)
  *E02F 3/32* (2006.01)
  *E02F 9/08* (2006.01)
  *F01N 11/00* (2006.01)
  *F02D 41/22* (2006.01)
  *F02D 41/24* (2006.01)
  *F01N 3/20* (2006.01)

(52) U.S. Cl.
  CPC .......... *E02F 9/0883* (2013.01); *E02F 9/2235* (2013.01); *F01N 11/00* (2013.01); *F02D 41/021* (2013.01); *F02D 41/0275* (2013.01); *F02D 41/22* (2013.01); *F02D 41/2422* (2013.01); *F01N 3/2066* (2013.01); *F01N 2550/05* (2013.01); *F01N 2590/08* (2013.01); *F02D 2041/228* (2013.01); *F02D 2200/604* (2013.01); *F02D 2250/26* (2013.01); *Y02T 10/40* (2013.01); *Y02T 10/47* (2013.01)

(58) Field of Classification Search
  CPC ........ Y02T 10/24; Y02T 10/47; E02F 9/2066; E02F 9/2235; E02F 3/32; E02F 9/0866; E02F 9/0833; F02D 41/021; F02D 41/22; F02D 41/0275; F02D 41/2422
  See application file for complete search history.

(56) References Cited

U.S. PATENT DOCUMENTS

| | | |
|---|---|---|
| 2007/0163245 A1* | 7/2007 | Sheridan ............... F01N 3/2066 60/286 |
| 2007/0214782 A1 | 9/2007 | Komiyama et al. |
| 2007/0266697 A1 | 11/2007 | Nishina et al. |
| 2009/0217644 A1* | 9/2009 | Jung ....................... F01N 3/208 60/276 |
| 2012/0303227 A1 | 11/2012 | Nakamura |
| 2014/0188326 A1* | 7/2014 | Jung ....................... F01N 11/00 701/29.2 |
| 2014/0188327 A1* | 7/2014 | Jung ..................... F01N 11/002 701/29.2 |
| 2015/0246613 A1* | 9/2015 | Shimazu ................ B60K 35/00 701/102 |

FOREIGN PATENT DOCUMENTS

| | | |
|---|---|---|
| JP | 2002-235533 A | 8/2002 |
| JP | 2002-371831 A | 12/2002 |
| JP | 2006-177317 A | 7/2006 |
| JP | 2007-321671 A | 12/2007 |
| JP | 2007-321672 A | 12/2007 |
| JP | 2009-114978 A | 5/2009 |
| JP | 2009-127521 | 6/2009 |
| JP | 2010-229986 A | 10/2010 |
| JP | 2013-160057 A | 8/2013 |
| JP | 2013-160104 A | 8/2013 |

* cited by examiner

WORK VEHICLE

TECHNICAL FIELD

The present invention relates to a work vehicle.

BACKGROUND ART

An exhaust treatment apparatus is mounted on such a work vehicle as a hydraulic excavator, a bulldozer, and a wheel loader. As the exhaust treatment apparatus, for example, a diesel particulate filter apparatus (DPF), a diesel oxidation catalyst apparatus (DOC), a selective catalytic reduction apparatus (SCR), and the like are available.

An exhaust treatment apparatus reduces a nitrogen oxide (NOx) contained in a gas exhausted from an engine (an exhaust gas), to a harmless gas through NOx reduction reaction. A work vehicle includes a reducing agent tank for storing a reducing agent for NOx reduction reaction, and the reducing agent stored in the reducing agent tank is injected into the exhaust gas.

In this regard, when a reducing agent stored in a reducing agent tank runs out during working of a work vehicle, an exhaust gas may be emitted into the air without NOx reduction reaction.

Therefore, Japanese Patent Laying-Open No. 2007-321671 and Japanese Patent Laying-Open No. 2007-321672 propose a scheme for urging an operator to replenish a reducing agent tank with a reducing agent by detecting an amount of remaining reducing agent stored in the reducing agent tank and controlling an engine to low output when the detected remaining amount is equal to or lower than a prescribed amount.

CITATION LIST

Patent Document

PTD 1: Japanese Patent Laying-Open No. 2007-321671
PTD 2: Japanese Patent Laying-Open No. 2007-321672

SUMMARY OF INVENTION

Technical Problem

A work vehicle has a plurality of working modes such that working in accordance with a load state (a condition during working) can be carried out, and efficient working can be carried out as an operator sets a working mode optimal for a load state.

In this connection, for example, when a working mode in which a load state is low is set as a state of a set working mode, working with an engine being controlled to low output can be carried out. In a case that the engine is controlled to low output in accordance with an amount of remaining reducing agent as in the scheme above, for example, in a case that working is carried out in a working mode in which a load state is low, it is less likely that an operator senses low output of the engine, and the operator is not sufficiently urged to do maintenance such as replenishment with a reducing agent.

The present invention was made in order to solve the problems as described above, and an object of the present invention is to provide a work vehicle allowing an operator to sense lowering in horsepower output from an engine regardless of a working mode in which working in accordance with a state of a reducing agent is carried out.

Other tasks and novel features will become apparent from the description herein and the attached drawings.

Solution to Problem

A work vehicle according to one aspect of the present invention having a plurality of working modes allowing working in accordance with a load state includes an engine, an exhaust gas purification apparatus, a reducing agent tank, a state determination portion, and an engine control unit. The exhaust gas purification apparatus purifies a nitrogen oxide in an exhaust gas emitted from the engine. The reducing agent tank stores a reducing agent to be supplied to the exhaust gas purification apparatus. The state determination portion determines a state of the reducing agent stored in the reducing agent tank. The engine control unit controls output of the engine in accordance with a state of the reducing agent determined by the state determination portion. The engine control unit controls output of the engine with the use of a restricted-operation engine output torque curve in which horsepower output from the engine is lower than horsepower output from the engine at the time when each of the plurality of working modes is selected, when a state of the reducing agent is equal to or lower than a reference value.

According to the work vehicle in the present invention, the state determination portion determines a state of the reducing agent stored in the reducing agent tank, and when a state of the reducing agent is equal to or lower than a reference value, the state determination portion controls output of the engine with the use of the restricted-operation engine output torque curve in which horsepower output from the engine is lower than horsepower output from the engine at the time when each of the plurality of working modes is selected. Thus, when a state of the reducing agent is equal to or lower than the reference value, regardless of the working mode in which working is carried out, the operator can sense lowering in horsepower output from the engine.

Preferably, the state determination portion determines a concentration of the reducing agent as the state of the reducing agent.

According to the above, since the state determination portion determines a concentration of the reducing agent, regardless of the working mode in which working is carried out, an operator can sense lowering in horsepower output from the engine, in accordance with quality of the reducing agent.

Preferably, the work vehicle further includes a work implement, a hydraulic actuator, a hydraulic pump, and a pump control unit. The hydraulic actuator drives the work implement. The hydraulic pump supplies hydraulic oil to the hydraulic actuator as the engine is driven. The pump control unit controls absorption torque of the hydraulic pump. The pump control unit sets maximum absorption torque based on the restricted-operation engine output torque curve and a restricted pump absorption torque characteristic line set when the state of the reducing agent is equal to or lower than the reference value.

According to the above, the pump control unit sets maximum absorption torque based on a restricted-operation engine output torque curve and a restricted pump absorption torque characteristic line set at the time when a state of the reducing agent is equal to or lower than the reference value. Thus, the maximum absorption torque of the hydraulic pump of the work implement is changed, and regardless of a working mode in which working is carried out, an operator can sense lowering in horsepower in working of the work implement.

A work vehicle according to another aspect of the present invention having a plurality of working modes allowing working in accordance with a load state includes an engine, an exhaust gas purification apparatus, a reducing agent tank, a state determination portion, and an engine control unit. The exhaust gas purification apparatus purifies a nitrogen oxide in an exhaust gas emitted from the engine. The reducing agent tank stores a reducing agent to be supplied to the exhaust gas purification apparatus. The state determination portion determines a state of the exhaust gas purification apparatus. The engine control unit controls output of the engine in accordance with a state of the exhaust gas purification apparatus determined by the state determination portion. The engine control unit controls output of the engine by using a restricted-operation engine output torque curve in which horsepower output from the engine is lower than horsepower output from the engine at the time when each of the plurality of working modes is selected, when the exhaust gas purification apparatus enters a prescribed state.

According to the work vehicle in the present invention, the state determination portion determines a state of the exhaust gas purification apparatus, and when the exhaust gas purification apparatus enters a prescribed state, the state determination portion controls output of the engine with the use of a restricted-operation engine output torque curve in which horsepower output from the engine is lower than horsepower output from the engine at the time when each of the plurality of working modes is selected. Thus, when the exhaust gas purification apparatus enters a prescribed state, regardless of a working mode in which working is carried out, an operator can sense lowering in horsepower output from the engine.

Preferably, the work vehicle further includes a work implement, a hydraulic actuator, a hydraulic pump, and a pump control unit. The hydraulic actuator drives the work implement. The hydraulic pump supplies hydraulic oil to the hydraulic actuator as the engine is driven. The pump control unit controls absorption torque of the hydraulic pump. The pump control unit sets maximum absorption torque based on the restricted-operation engine output torque curve and a restricted pump absorption torque characteristic line set when the exhaust gas purification apparatus enters the prescribed state.

According to the above, the pump control unit sets maximum absorption torque based on a restricted-operation engine output torque curve and a restricted pump absorption torque characteristic line set at the time when the exhaust gas purification apparatus enters a prescribed state. Thus, maximum absorption torque of the hydraulic pump of the work implement is changed, and regardless of a working mode in which working is carried out, an operator can sense lowering in horsepower in working of the work implement.

Preferably, the restricted-operation engine output torque curve is lower in at least one of a maximum number of rotations of the engine and torque than a normal-operation engine output torque curve set at the time when each of the plurality of working modes is selected.

According to the above, the restricted-operation engine output torque curve is lower in at least one of the maximum number of rotations of the engine and torque than the normal-operation engine output torque curve, and hence horsepower output from the engine can be lowered.

Preferably, the restricted-operation engine output torque curve is set to be lower in horsepower by 5% or more than horsepower in accordance with a normal-operation engine output torque curve set at the time when each of the plurality of working modes is selected.

According to the above, the restricted-operation engine output torque curve is set to be lower in horsepower by 5% or more than horsepower in accordance with a normal-operation engine output torque curve set at the time when each of the plurality of working modes is selected. Therefore, an operator can sufficiently sense lowering in horsepower output from the engine.

A work vehicle according to another aspect of the present invention having a plurality of working modes allowing working in accordance with a load state includes an engine, an exhaust gas purification apparatus, a reducing agent tank, a state determination portion, a hydraulic pump, and a pump control unit. The exhaust gas purification apparatus purifies a nitrogen oxide in an exhaust gas emitted from the engine. The reducing agent tank stores a reducing agent to be supplied to the exhaust gas purification apparatus. The state determination portion determines a state of the reducing agent stored in the reducing agent tank. The hydraulic pump is driven by the engine. The pump control unit controls the hydraulic pump in accordance with a state of the reducing agent determined by the state determination portion. The pump control unit controls absorption torque of the hydraulic pump with the use of a restricted-operation pump absorption torque characteristic line in which maximum absorption torque of the hydraulic pump is lower than maximum absorption torque of the hydraulic pump at the time when each of the plurality of working modes is selected, when a state of the reducing agent is equal to or lower than a reference value.

According to the work vehicle in the present invention, the state determination portion determines a state of the reducing agent stored in the reducing agent tank. When a state of the reducing agent is equal to or lower than a reference value, the state determination portion controls absorption torque of the hydraulic pump with the use of a restricted-operation pump absorption torque characteristic line in which maximum absorption torque of the hydraulic pump is lower than maximum absorption torque of the hydraulic pump at the time when each of the plurality of working modes is selected, when a state of the reducing agent is equal to or lower than a reference value. Thus, when a state of the reducing agent is equal to or lower than the reference value, maximum absorption torque of the hydraulic pump of the work implement is changed, and regardless of a working mode in which working is carried out, an operator can sense lowering in horsepower in working of the work implement.

A work vehicle according to another aspect of the present invention having a plurality of working modes allowing working in accordance with a load state includes an engine, an exhaust gas purification apparatus, a reducing agent tank, a state determination portion, a hydraulic pump, and a pump control unit. The exhaust gas purification apparatus purifies a nitrogen oxide in an exhaust gas emitted from the engine. The reducing agent tank stores a reducing agent to be supplied to the exhaust gas purification apparatus. The state determination portion determines a state of the exhaust gas purification apparatus. The hydraulic pump is driven by the engine. The pump control unit controls the hydraulic pump in accordance with the state of the exhaust gas purification apparatus determined by the state determination portion. The pump control unit controls absorption torque of the hydraulic pump with the use of a restricted-operation pump absorption torque characteristic line in which maximum absorption torque of the hydraulic pump is lower than maximum absorption torque of the hydraulic pump at the time when each of the plurality of working modes is selected, when the exhaust gas purification apparatus enters a prescribed state.

According to the work vehicle in the present invention, the state determination portion determines a state of the exhaust gas purification apparatus, and when the exhaust gas purification apparatus enters a prescribed state, the state determination portion controls absorption torque of the hydraulic pump with the use of a restricted-operation pump absorption torque characteristic line in which maximum absorption torque of the hydraulic pump is lower than maximum absorption torque of the hydraulic pump at the time when each of the plurality of working modes is selected. Thus, when the exhaust gas purification apparatus enters a prescribed state, maximum absorption torque of the hydraulic pump of the work implement is changed, and regardless of a working mode in which working is carried out, an operator can sense lowering in horsepower in working of the work implement.

Preferably, the work vehicle further includes a notification portion. The notification portion gives notification of a result of determination by the state determination portion.

According to the above, since the notification portion gives notification of a result of detection by the state determination portion, an operator can readily recognize the result of detection.

Advantageous Effects of Invention

Regardless of a working mode in which working is carried out in accordance with a state of a reducing agent, an operator can sense lowering in horsepower output from an engine.

DESCRIPTION OF EMBODIMENTS

Figure 1:
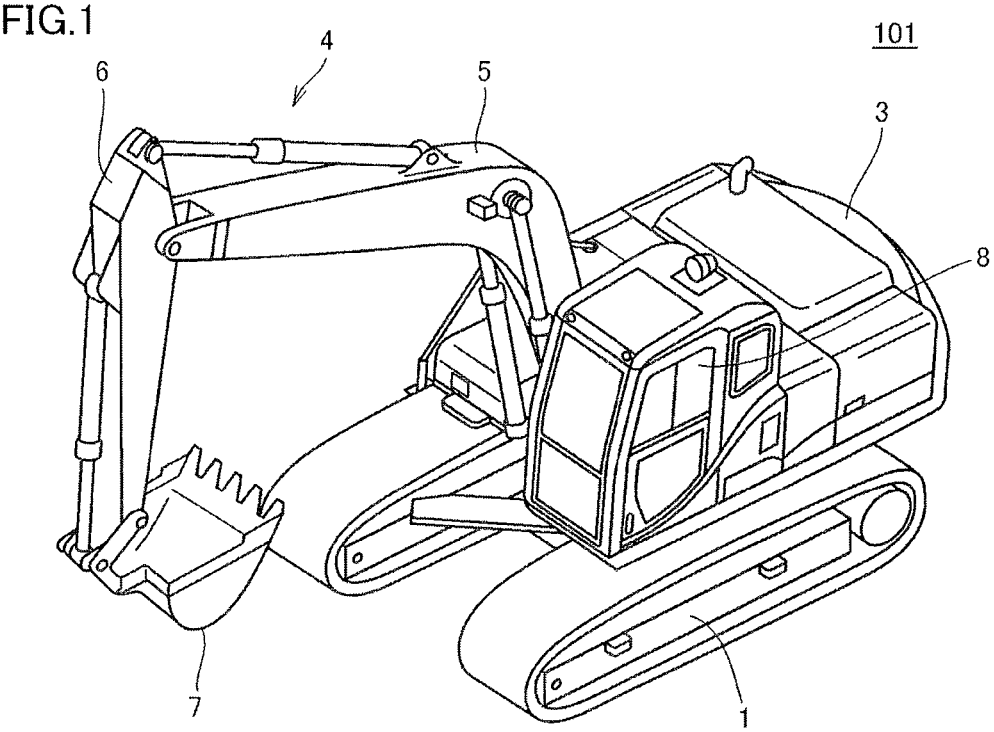
FIG. 1 is a diagram illustrating appearance of a work vehicle 101 based on an embodiment.

An embodiment of the present invention will be described hereinafter with reference to the drawings.
<Overall Construction>
FIG. 1 is a diagram illustrating appearance of a work vehicle 101 based on an embodiment.

As shown in FIG. 1, in the present example, a hydraulic excavator will mainly be described by way of example as work vehicle 101 based on the embodiment.

Work vehicle 101 mainly includes a lower carrier 1, an upper revolving unit 3, and a work implement 4. A work vehicle main body is constituted of lower carrier 1 and upper revolving unit 3. Lower carrier 1 has a pair of left and right crawler belts. Upper revolving unit 3 is attached revolvably, with a revolving mechanism in an upper portion of lower carrier 1 being interposed.

Work implement 4 is pivotably supported by upper revolving unit 3 in a manner operable in a vertical direction and performs such working as excavation of soil. Work implement 4 includes a boom 5, an arm 6, and a bucket 7. Boom 5 has a root portion movably coupled to upper revolving unit 3. Arm 6 is movably coupled to a tip end of boom 5. Bucket 7 is movably coupled to a tip end of arm 6. In addition, upper revolving unit 3 includes an operator's cab 8 or the like.

Figure 2:
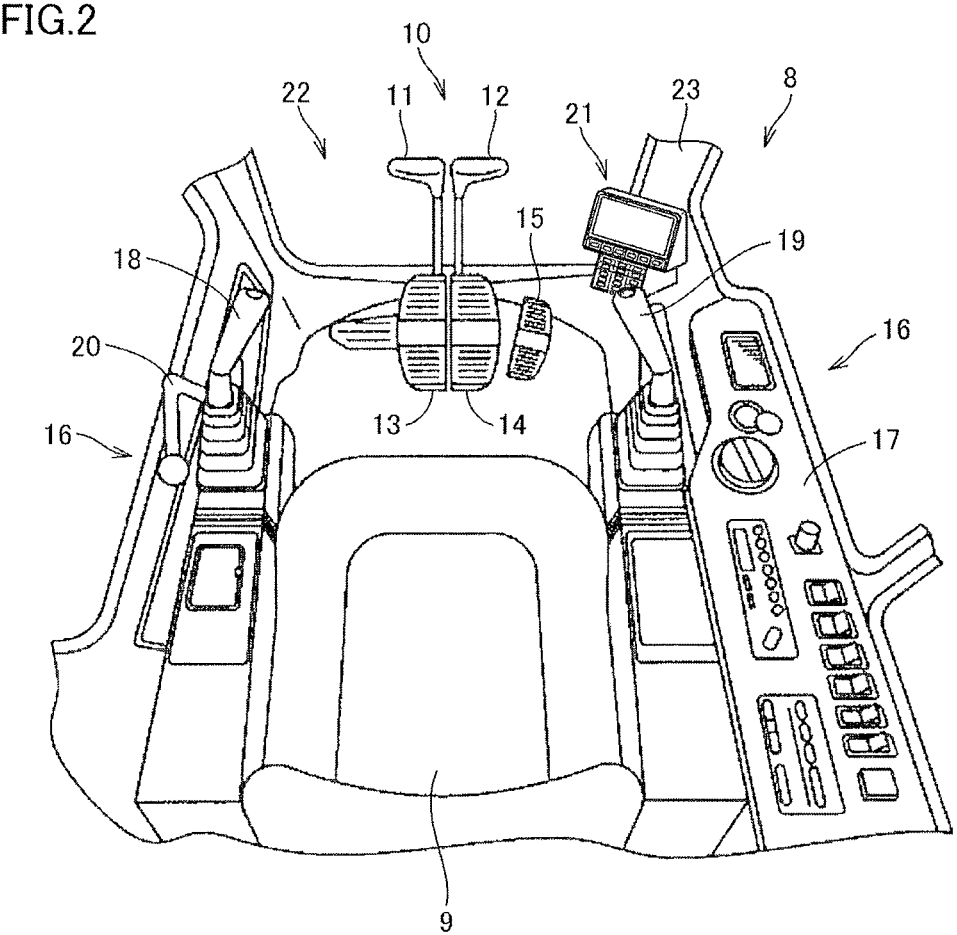
FIG. 2 is a perspective view showing an internal construction of an operator's cab 8 based on the embodiment.

<Construction of Operator's Cab>
FIG. 2 is a perspective view showing an internal construction of operator's cab 8 based on the embodiment.

As shown in FIG. 2, operator's cab 8 has an operator's seat 9, a travel operation portion 10, a pedal for attachment 15, a side window 16, a dashboard 17, work implement levers 18, 19, a locking lever 20, a monitor apparatus 21, a front window 22, and a vertical frame 23.

Operator's seat 9 is provided in a central portion of operator's cab 8. Travel operation portion 10 is provided in front of operator's seat 9.

Travel operation portion 10 includes travel levers 11, 12 and travel pedals 13, 14. Travel pedals 13, 14 can move together with respective travel levers 11, 12. Lower carrier 1 moves forward as an operator pushes forward travel lever 11, 12. Alternatively, lower carrier 1 moves backward as the operator pulls backward travel lever 11, 12.

Pedal for attachment 15 is provided in the vicinity of travel operation portion 10. In addition, dashboard 17 is provided in the vicinity of right side window 16 in FIG. 2.

Work implement levers 18, 19 are provided in left and right portions of operator's seat 9, respectively. Work implement lever 18, 19 serves to carry out vertical movement of boom 5, pivot of arm 6 and bucket 7, a revolving operation of upper revolving unit 3, and the like.

Locking lever 20 is provided in the vicinity of work implement lever 18. Here, locking lever 20 serves to stop such functions as operation of work implement 4, revolution of upper revolving unit 3, and travel of lower carrier 1. By performing an operation for positioning locking lever 20 in a vertical state (here, an operation for pulling down the locking lever), movement of work implement 4 or the like can be locked (restricted). In a state where locking lever 20 has locked movement of work implement 4 or the like, work implement 4 or the like does not operate in spite of an operation of work implement lever 18, 19 by the operator. In addition, similarly, even though travel lever 11, 12 and travel pedal 13, 14 are operated, lower carrier 1 does not operate. On the other hand, by performing an operation for positioning locking lever 20 in a horizontal state (here, an operation for pulling up the locking lever), movement of work implement 4 or the like can be unlocked (not restricted). Thus, work implement 4 or the like can operate.

Monitor apparatus 21 is provided in a lower portion of vertical frame 23 which is a partition between front window 2 and one side window 16 of operator's cab 8 and it displays an engine state of work vehicle 101, guidance information, warning information, or the like. In addition, monitor apparatus 21 is provided to be able to accept a setting instruction as to various operations of work vehicle 101.

Here, an engine state refers, for example, to a temperature of an engine coolant, a temperature of hydraulic oil, an amount of remaining fuel, and the like. Guidance information includes an indication and the like inviting check and maintenance of the engine of the work vehicle, by way of example. In the present example, for example, in order to encourage replenishment with a reducing agent, information indicating a state of restriction of engine output can be displayed. Various operations refer to setting of a working mode. Warning information is information to which operator's attention should be called.

<Configuration of Control System>

Figure 3:
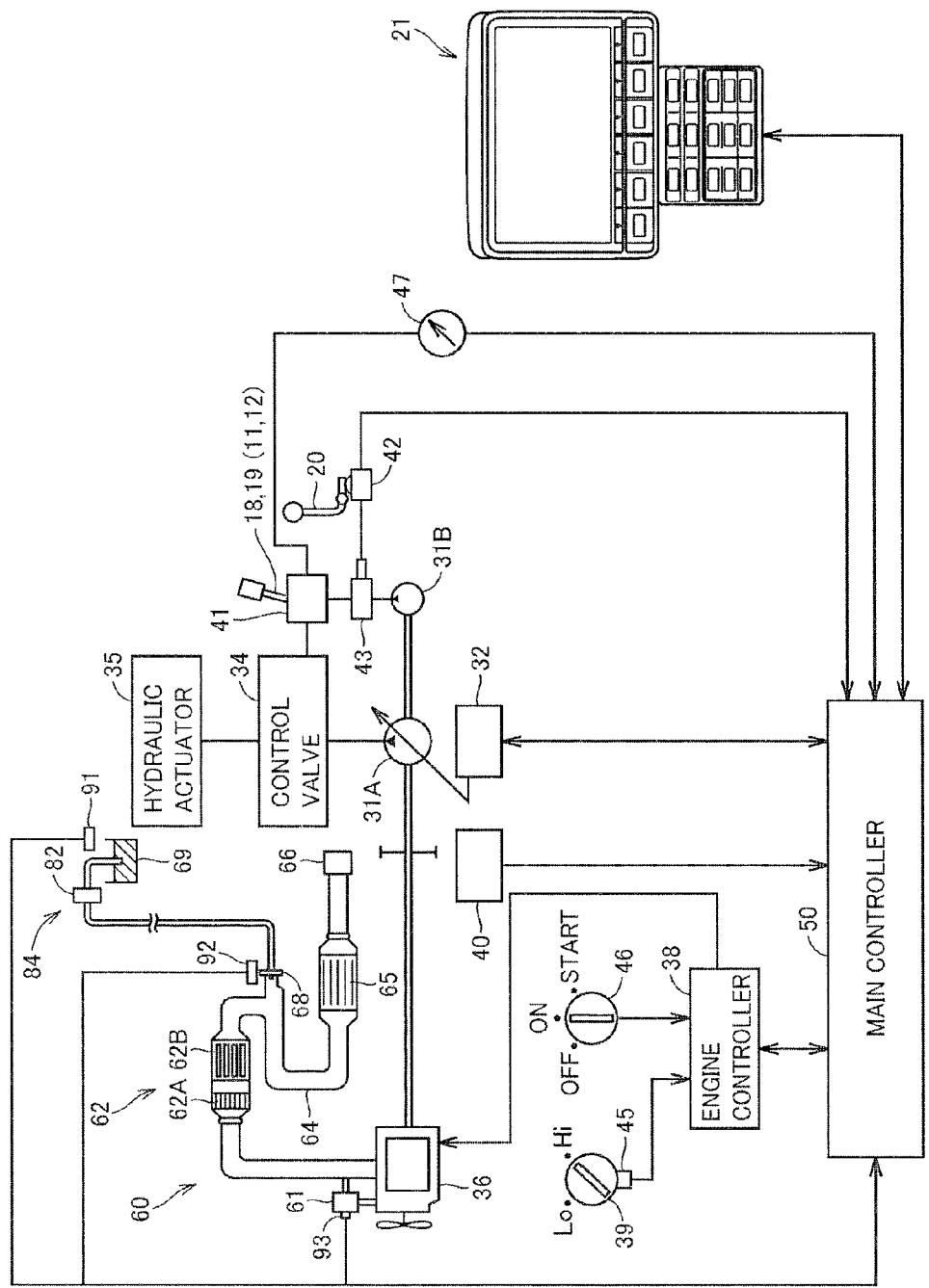
FIG. 3 is a simplified diagram showing a configuration of a control system of work vehicle 101 based on the embodiment.

FIG. 3 is a simplified diagram showing a configuration of a control system of work vehicle 101 based on the embodiment.

As shown in FIG. 3, the control system of work vehicle 101 includes, by way of example, work implement lever 18, 19 and travel lever 11, 12, locking lever 20, monitor apparatus 21, a first hydraulic pump 31A, a second hydraulic pump 31B, a swash plate drive apparatus 32, a control valve 34, a hydraulic actuator 35, an engine 36, an engine controller 38, a fuel dial 39, a rotation sensor 40, a work implement lever apparatus 41, a pressure switch 42, a valve 43, a potentiometer 45, a starter switch 46, a pressure sensor 47, and a main controller 50.

In addition, the control system of work vehicle 101 further includes an exhaust gas purification apparatus 60 and a reducing agent tank 69.

Exhaust gas purification apparatus 60 further includes an EGR (Exhaust Gas Recirculation) 61, an exhaust purification unit 62, a relay connection pipe (mixing piping) 64, a selective catalytic reduction apparatus 65, a flue 66, and a reducing agent injector 84.

Reducing agent injector 84 has a reducing agent supply pump 82 and a reducing agent injection valve 68.

Exhaust purification unit 62 includes a diesel oxidation catalyst apparatus 62A and a diesel particulate filter apparatus 62B.

First hydraulic pump 31A discharges hydraulic oil used for driving work implement 4 or the like.

Second hydraulic pump 31B discharges oil made use of for generating a hydraulic pressure (a pilot pressure) in accordance with an operation of work implement lever 18, 19 and travel lever 11, 12. Swash plate drive apparatus 32 is connected to first hydraulic pump 31A.

Swash plate drive apparatus 32 drives based on an instruction from main controller 50 and changes an angle of inclination of a swash plate of first hydraulic pump 31A. Hydraulic actuator 35 is connected to first hydraulic pump 31A with control valve 34 being interposed. Hydraulic actuator 35 is a cylinder for boom, a cylinder for arm, a cylinder for bucket, a hydraulic motor for revolution, a hydraulic motor for travel, and the like.

Control valve 34 is connected to work implement lever apparatus 41. Work implement lever apparatus 41 outputs to control valve 34, a pilot pressure in accordance with a direction of operation and/or an amount of operation of work implement lever 18, 19 and travel lever 11, 12. Control valve 34 controls hydraulic actuator 35 in accordance with the pilot pressure.

Work implement lever 18, 19 and travel lever 11, 12 as well as locking lever 20 are connected to second hydraulic pump 31B.

Pressure sensor 47 is connected to work implement lever apparatus 41. Pressure sensor 47 outputs to main controller 50, a lever operation signal in accordance with a state of operation of work implement lever 18, 19 and travel lever 11, 12.

Main controller 50 carries out such control that first hydraulic pump 31A absorbs best matching torque at each output point of engine 36, in accordance with pump absorption torque set in accordance with an amount of working, the number of rotations of the engine set with fuel dial 39 or the like, the actual number of rotations of the engine, and the like.

Engine 36 has a drive shaft connected to first hydraulic pump 31A and second hydraulic pump 31B.

In response to an instruction from main controller 50, engine controller 38 controls an operation of engine 36. Engine 36 is a diesel engine by way of example. The number of engine rotations of engine 36 is set with fuel dial 39 or the like and the actual number of engine rotations is detected by rotation sensor 40. Rotation sensor 40 is connected to main controller 50.

Fuel dial 39 is provided with potentiometer 45, which detects an amount of operation of fuel dial 39 and outputs a value indicated by a dial (also referred to as a dial indication value) regarding the number of rotations of engine 36 to engine controller 38. A target number of rotations of engine 36 is adjusted in accordance with the dial indication value of fuel dial 39.

In response to an instruction from main controller 50, engine controller 38 controls an amount of injection of fuel injected by a fuel injector and adjusts the number of rotations of engine 36. Engine controller 38 adjusts the number of rotations of the engine in accordance with a control instruction from main controller 50 to first hydraulic pump 31A Starter switch 46 is connected to engine controller 38. As the operator operates starter switch 46 (sets the starter switch to start), a start signal is output to engine controller 38 so that engine 36 starts.

Main controller 50 is a controller controlling overall work vehicle 101, and it is configured with a CPU (Central Processing Unit), a non-volatile memory, a timer, and the like. Main controller 50 controls engine controller 38 and monitor apparatus 21. Though main controller 50 and engine controller 38 are separate from each other in the present example, one common controller can also be provided.

Pressure switch 42 is connected to locking lever 20. Pressure switch 42 senses an operation of locking lever 20 when it is operated toward a locking side, and sends a signal to valve (solenoid valve) 43. Since valve 43 thus cuts off supply of oil, such functions as operation of work implement 4, revolution of upper revolving unit 3, and travel of lower carrier 1 can be stopped. In addition, pressure switch 42 sends a similar signal also to main controller 50.

Diesel oxidation catalyst apparatus 62A has a function to decrease nitric oxide (NO) of nitrogen oxides (NOx) in the exhaust gas from engine 36 and increase nitrogen dioxide ($NO_2$).

Diesel particulate filter apparatus 62B is an apparatus treating an exhaust from engine 36. Diesel particulate filter apparatus 62B is constructed to collect particulate matters included in the exhaust from engine 36 with a filter and burn the collected particulate matters. The filter is composed, for example, of ceramics.

Selective catalytic reduction apparatus 65 serves to reduce a nitrogen oxide NOx by using ammonia ($NH_3$) resulting from hydrolysis, for example, of an urea solution as a reducing agent. Selective catalytic reduction apparatus 65 applies, in principle, chemical reaction of a nitrogen oxide (NOx) with ammonia ($NH_3$), which results in reduction to nitrogen ($N_2$) and water ($H_2O$). For example, reducing agent tank 69 containing an urea solution is mounted on work vehicle 101. It is noted that the reducing agent is not limited to a urea solution and a reducing agent should only be able to reduce a nitrogen oxide NOx.

Relay connection pipe (mixing piping) 64 connects between diesel particulate filter apparatus 62B and selective catalytic reduction apparatus 65. In this mixing piping 64, a reducing agent is injected to an exhaust gas from the diesel particulate filter apparatus to selective catalytic reduction apparatus 65 and mixed.

Reducing agent injector 84 injects a reducing agent (a urea solution) pumped up from reducing agent tank 69 by reducing agent supply pump 82 to the exhaust gas through reducing agent injection valve 68.

Sensor 91 is provided for reducing agent tank 69 and detects a state of a reducing agent stored in reducing agent tank 69. In the present example, at least any one of an amount of liquid and quality (for example, a concentration of a urea solution) is detected as a state of the reducing agent. Then, sensor 91 outputs a result of detection from reducing agent tank 69 to main controller 50.

For example, an amount of liquid can be detected by adopting an ultrasonic or optical liquid level sensor as sensor 91. Any means may be adopted as sensor 91 so long as it is means capable of detecting an amount of liquid (for example, electrical means). A concentration sensor can be adopted as sensor 91 for detection of quality (a concentration of a urea solution). Any means may be adopted so long as it is means capable of detecting a concentration (for example, chemical reaction means). A sensor may be such that a liquid level sensor and a concentration sensor are combined.

Sensor 92 is provided for reducing agent injection valve 68 and detects a state of reducing agent injection valve 68. In the present example, a state (that is, a status) of an injection valve is detected as a state of reducing agent injection valve 68. Sensor 92 outputs a result of detection of a state of reducing agent injection valve 68 to main controller 50.

Sensor 93 is provided for EGR 61 and detects a state of EGR 61. In the present example, a result of detection of a state of piping of EGR 61 is output as a state of EGR 61 to main controller 50.

Flue 66 is connected to selective catalytic reduction apparatus 65 and it serves to exhaust an exhaust which has passed through selective catalytic reduction apparatus 65 into the atmosphere.

EGR 61 is an apparatus for extracting some of an exhaust gas after combustion and guiding the same to an intake side for reabsorption. A nitrogen oxide NOx in an exhaust gas can thus be decreased.

It is noted that engine 36, exhaust gas purification apparatus 60, reducing agent tank 69, and first hydraulic pump 31A represent examples of the "engine", the "exhaust gas purification apparatus," the "reducing agent tank," and the "hydraulic pump" of the present invention, respectively.

<Functional Block Diagram>

Figure 4:
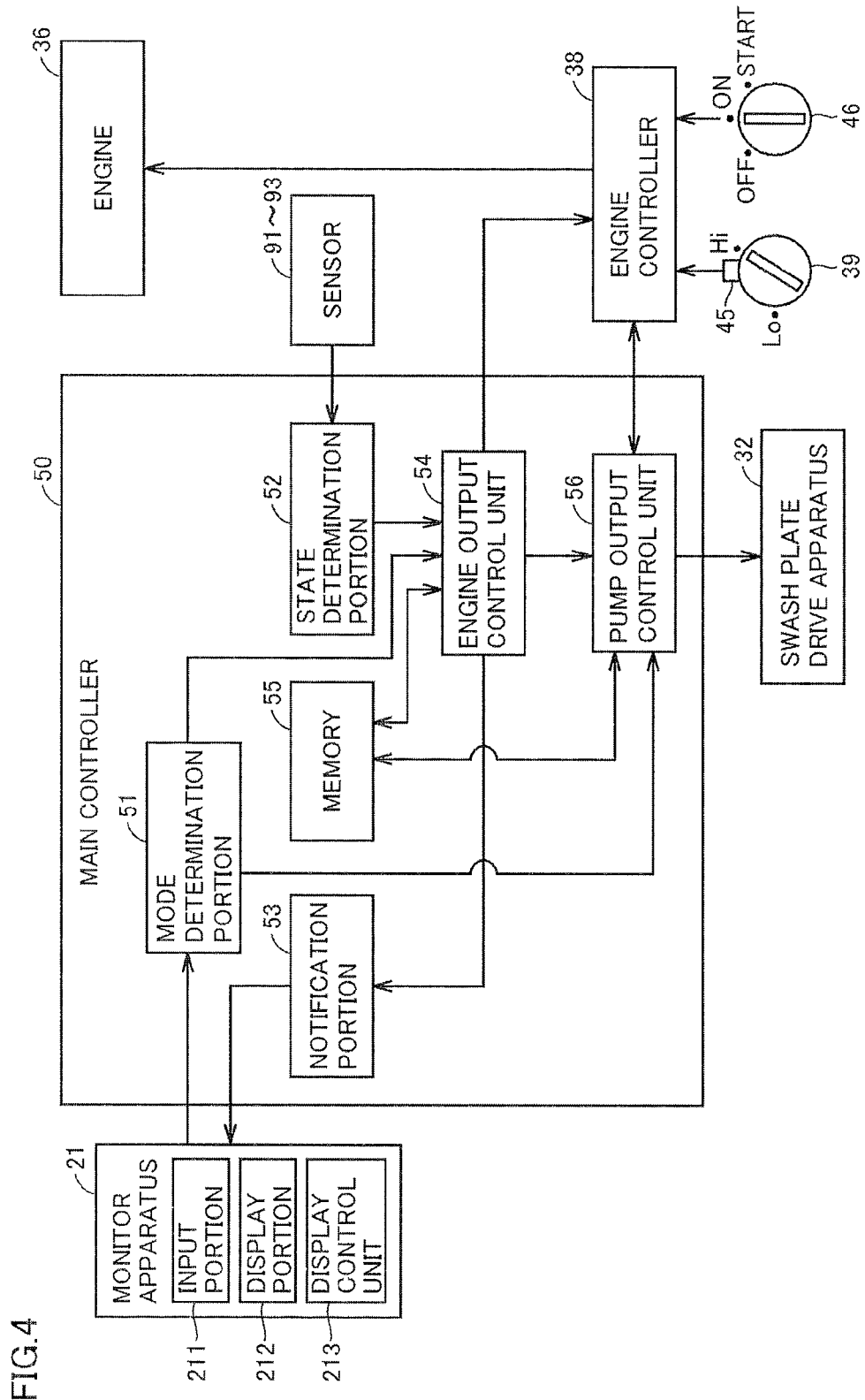
FIG. 4 is a functional block diagram illustrating a main controller 50 in the control system of work vehicle 101 based on the embodiment.

FIG. 4 is a functional block diagram illustrating main controller 50 in the control system of work vehicle 101 based on the embodiment.

As shown in FIG. 4, relation between main controller 50 and other peripheral devices is shown. Here, monitor apparatus 21, engine 36, engine controller 38, fuel dial 39, potentiometer 45, starter switch 46, and sensors 91 to 93 are shown as the peripheral devices.

Main controller 50 includes a mode determination portion 51, a state determination portion 52, a notification portion 53, a memory 55, an engine output control unit 54, and a pump output control unit 56.

Monitor apparatus 21 includes an input portion 211, a display portion 212, and a display control unit 213.

Mode determination portion 51 accepts selection input through a working mode selection switch 112 (FIG. 5) of input portion 211 and determines a working mode. In the present example, as will be described later, a "P" mode and "E0" to "E3" modes are provided, and which selection input has been accepted is determined. Mode determination portion 51 outputs a result of determination to engine output control unit 54.

Memory 55 stores various types of information relating to engine output torque control and pump absorption torque control. Specifically, memory 55 stores information on an engine output torque curve and a pump absorption torque characteristic line which will be described later.

Engine output control unit 54 receives input of a result of determination of a working mode from mode determination portion 51, and obtains an engine output torque curve corresponding to a selected working mode among engine output curves corresponding to the plurality of working modes stored in memory 55.

Then, engine output control unit 54 sets and instructs engine controller 38 to control engine 36 in accordance with an engine output torque curve corresponding to the obtained working mode. Engine output control unit 54 outputs information on the set engine output torque curve to pump output control unit 56.

Engine controller 38 controls engine 36 in accordance with the engine output torque curve set in correspondence with the working mode. Thus, torque based on the number of rotations of engine 36 is output from engine 36 in accordance with characteristics of the set engine output torque curve.

Pump output control unit 56 accepts input of a result of determination of a working mode from mode determination portion 51 or a notification from engine output control unit 54, and obtains a pump absorption torque characteristic line corresponding to a selected working mode among a plurality of pump absorption torque characteristic lines stored in memory 55.

Then, pump output control unit 56 controls the hydraulic pump (for example, first hydraulic pump 31A) in accordance with the obtained pump absorption torque characteristic line. Specifically, pump output control unit 56 controls a swash plate of the hydraulic pump (for example, first hydraulic pump 31A) in accordance with the number of rotations of the engine input from engine controller 38 in accordance with the pump absorption torque characteristic line set in correspondence with a working mode.

Pump output control unit 56 calculates an output torque point MP as a maximum absorption torque value which is an intersection between an obtained pump absorption torque characteristic line EGOVP and an engine output torque curve LP output from engine output control unit 54. Thus, pump output control unit 56 controls the swash plate of the hydraulic pump such that a torque value of the hydraulic pump (for example, first hydraulic pump 31A) does not exceed the maximum absorption torque value, which is also the case with other working modes.

State determination portion 52 determines various states based on sensor values input from sensors 91 to 93.

State determination portion 52 provides output to engine output control unit 54, based on a result of detection of a state of the reducing agent stored in reducing agent tank 69 from sensor 91. Specifically, when state determination portion 52 determines that an amount of liquid of the reducing agent stored in reducing agent tank 69 is equal to or smaller than a prescribed amount, it outputs the fact that such a state is established to engine output control unit 54. When state determination portion 52 determines that an amount of liquid of the reducing agent stored in reducing agent tank 69 is equal to or smaller than a prescribed lower amount, it outputs the fact that such a state is established to engine output control unit 54. Here, though a case that, when state determination portion 52 determines that an amount of liquid of the reducing agent stored in reducing agent tank 69 is equal to or smaller than a prescribed amount, it outputs the fact that such a state is established to engine output control unit 54 is described, quality (for example, a concentration of ammonia) may be determined without particularly limited to an amount of liquid. Specifically, when the state determination portion determines that a ratio of a prescribed component of the reducing agent stored in reducing agent tank 69 is equal to or lower than a prescribed value, it outputs the fact that such a state is established to engine output control unit 54. When state determination portion 52 determines that a ratio of a prescribed component of the reducing agent stored in reducing agent tank 69 is equal to or lower than a prescribed lower value, it outputs the fact that such a state is established to engine output control unit 54. State determination portion 52 may make determination based on a result of detection of both of an amount of liquid and quality from sensor 91.

State determination portion 52 provides output to engine output control unit 54 based on a result of detection of a state of reducing agent injection valve 68 from sensor 92. Specifically, when state determination portion 52 determines that reducing agent injection valve 68 is in an abnormal condition, it outputs the fact that such a state is established to engine output control unit 54.

State determination portion 52 provides output to engine output control unit 54 based on a result of detection of a state of EGR 61 from sensor 93. Specifically, when state determination portion 52 determines that EGR 61 is in an abnormal condition, it outputs the fact that such a state is established to engine output control unit 54.

Notification portion 53 gives an instruction for notification of guidance information in response to an instruction from engine output control unit 54.

Display control unit 213 of monitor apparatus 21 causes display portion 212 to display prescribed guidance information in response to an instruction from notification portion 53.

State determination portion 52, notification portion 53, engine output control unit 54, and pump output control unit 56 represent examples of the "state determination portion," the "notification portion", the "engine control unit," and the "pump control unit" of the present invention, respectively.

<Monitor Apparatus>

A configuration of monitor apparatus 21 will now be described.

Figure 5:
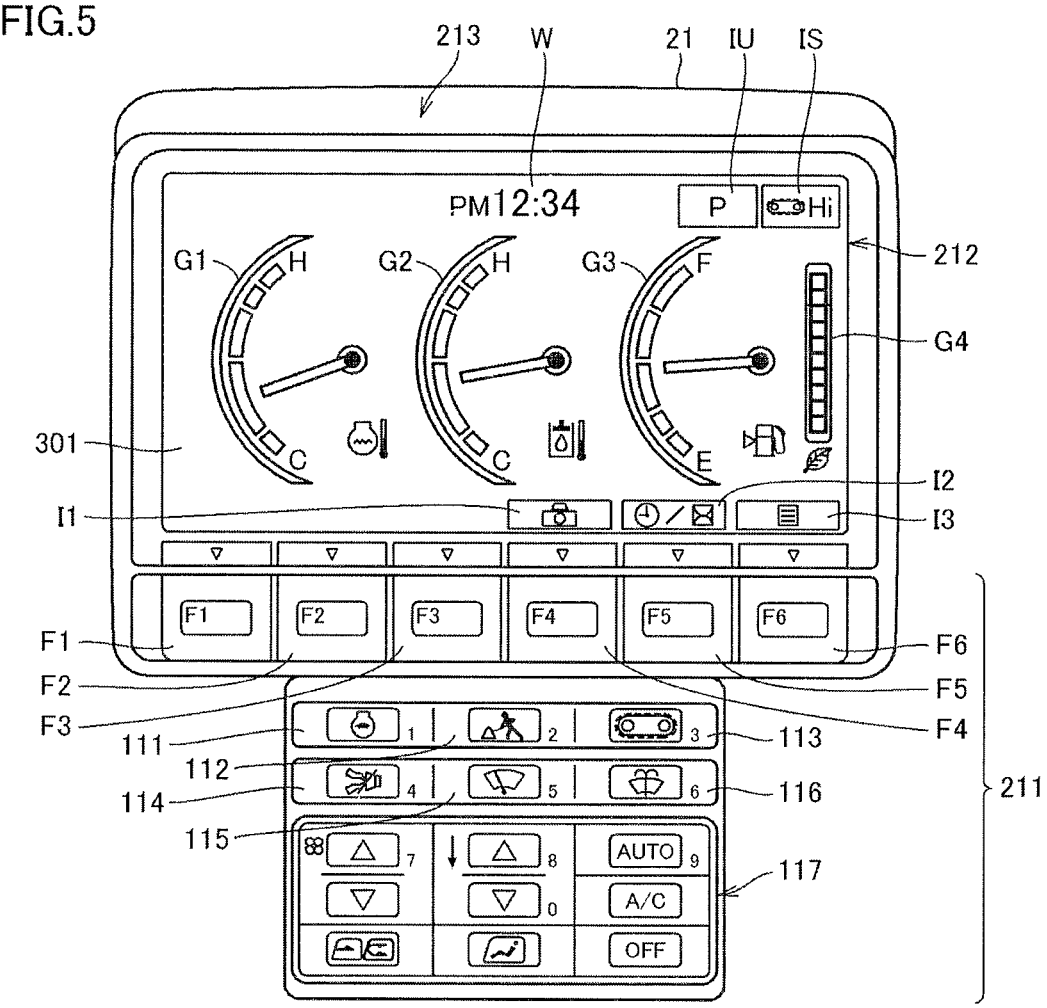
FIG. 5 is a diagram illustrating a configuration of a monitor apparatus 21 based on the embodiment.

FIG. 5 is a diagram illustrating a configuration of monitor apparatus 21 based on the embodiment.

As shown in FIG. 5, monitor apparatus 21 includes input portion 211, display portion 212, and display control unit 213.

Input portion 211 accepts input of various types of information. Monitor apparatus 21 is connected to main controller 50, and input accepted at input portion 211 is output to main controller 50.

Display portion 212 is implemented by a liquid crystal screen or the like.

Display control unit 213 controls display contents on display portion 212. Specifically, display control unit 213 provides display of information on an operation of work vehicle 101 in response to an instruction from main controller 50. The information includes information on an engine state or guidance information, warning information, and the like.

Input portion 211 will specifically be described. Input portion 211 is constituted of a plurality of switches. Input portion 211 has function switches F1 to F6.

Function switches F1 to F6 are located in a lower portion of display portion 212 and displayed as "F1" to "F6", respectively. They are switches each for inputting a signal corresponding to an icon displayed on display portion 212 above each switch (by way of example, guidance icons I1 to I3).

In addition, input portion 211 has a deceleration switch 111, working mode selection switch 112, a travel speed gear selection switch 113, a buzzer cancellation switch 114, a wiper switch 115, a washer switch 116, and an air-conditioner switch 117, provided under function switches F1 to F6.

Deceleration switch 111 is a switch for carrying out deceleration control for lowering the number of engine rotations of engine 36 to a prescribed number of rotations a prescribed time period after work implement lever 18, 19 returned to a neutral position. The "neutral position" refers to a state that work implement lever 18, 19 is not operated (a non-working state).

Working mode selection switch 112 is a switch for selecting a working mode of work vehicle 101 from among a plurality of working modes. Travel speed gear selection switch 113 is a switch for selecting a travel speed gear of work vehicle 101 from among a plurality of travel speed gears. Buzzer cancellation switch 114 is a switch for cancelling buzzer sound generated at the time when work vehicle 101 is in a prescribed warning condition. Wiper switch 115 is a switch for operating a wiper (not shown) provided in a windshield of operator's cab 8 (see FIG. 2) of work vehicle 101. Washer switch 116 is a switch for actuating a washer (not shown) for injecting cleaning water toward the windshield. Air-conditioner switch 117 is a switch for operating various functions of an air-conditioner within operator's cab 8.

It is noted that a touch panel of a resistive film type or the like is also applicable as input portion 211. In the present example, a case where work vehicle 101 displays a standard picture 301 displayed during a normal operation as a picture displayed on display portion 212 is shown.

Standard picture 301 is generated by display control unit 213 based on picture data, which is stored in advance in a not-shown memory. This is also the case with other pictures.

In standard picture 301, an engine water temperature gauge G1, a hydraulic oil temperature gauge G2, and a fuel level gauge G3 are displayed as aligned, and a pointer of a gauge changes based on a sensor signal from each corresponding sensor. In addition, a fuel consumption gauge G4 is displayed on the right of fuel level gauge G3.

A clock W is displayed in an upper central portion of display portion 212. On the right of clock W, a working mode icon IU indicating a set working mode and a travel speed gear icon IS indicating a set travel speed gear are displayed.

In standard picture 301, a character "P" is displayed as working mode icon IU. This is an indication of a case where a working mode is set to a power mode made use of in normal excavation working or the like.

In contrast, in a case where work vehicle 101 is set to an economy mode, it is assumed that a character "E" is displayed as working mode icon IU.

In addition, in standard picture 301, an icon including such a character string as "Hi" is displayed as travel speed gear icon IS.

This icon is an indication of a case where a travel speed gear is set to high. A travel speed gear selected and input through travel speed gear selection switch 113 includes three types of low, intermediate, and high.

Among these, when a low speed is selected, an icon including a character string "Lo" is displayed as travel speed gear icon IS. Alternatively, when an intermediate speed is selected, an icon including a character string "Mi" is displayed as travel speed gear icon IS.

At a position in a lower portion of standard picture 301 and above function switches F4 to F6, guidance icons I1 to I3 corresponding to function switches F4 to F6, respectively, are displayed.

Guidance icon I1 is an icon meaning switching of a picture displayed on display portion 212 to a camera screen. The camera screen is a screen output by means of an image signal obtained by a CCD camera or the like (not shown) installed on the exterior of work vehicle 101 and shooting an outside world of work vehicle 101. Guidance icon I2 is an icon meaning switching of display of clock W to display of a service meter. Guidance icon I3 is an icon meaning switching of a picture displayed on display portion 212 to a user mode picture. Therefore, for example, when function switch F4 corresponding to guidance icon I1 is pressed, a picture displayed on display portion 212 is switched to a camera screen.

Figure 6:
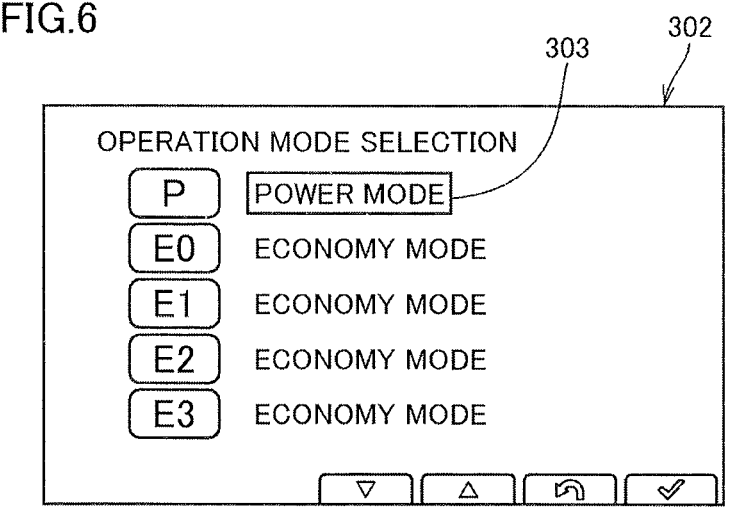
FIG. 6 is a diagram illustrating one example of a working mode selection picture based on the embodiment.

FIG. 6 is a diagram illustrating one example of a working mode selection picture based on the embodiment.

As shown in FIG. 6, a working mode selection picture 302 is displayed as a result of transition from standard picture 301, in response to selection of working mode selection switch 112 (FIG. 5).

In the present example, a plurality of working modes are provided such that working in accordance with a load state can be carried out. In the present example, icons including characters of "P" representing a P mode (power mode) and "E0" to "E3" representing E modes (economy modes), respectively, are displayed, and names of the respective modes are displayed on the right thereof.

The P mode is a mode for heavy load working such as heavy excavation working and the E mode is a mode for light load working such as normal excavation working. In the E mode, maximum output of engine 36 is suppressed as compared with the P mode. Four types of modes are provided for the E mode. In the present example, economy modes from "E0" to "E3" are provided such that efficient working can be carried out while fuel consumption is suppressed in accordance with states lower in load state in a stepwise manner. Specifically, engine 36 is controlled in accordance with an engine output torque curve provided in correspondence with each mode. In the present example, the economy mode of "E3" is provided as a working mode lowest in load state.

A case that a cursor 303 is displayed at a position of selection of the P mode is shown here. For example, when the icon for the E3 mode is selected in response to an operation instruction through input portion 211, the character of the E3 mode is highlighted and a state of selection of that mode is set. Control of engine 36 by engine controller 38 is changed in accordance with selection of a working mode.

Though a case that there are four E modes other than the P mode is exemplified here, one E mode as well as an arm crane mode and a breaker mode other than the P mode may be provided.

Figure 7:
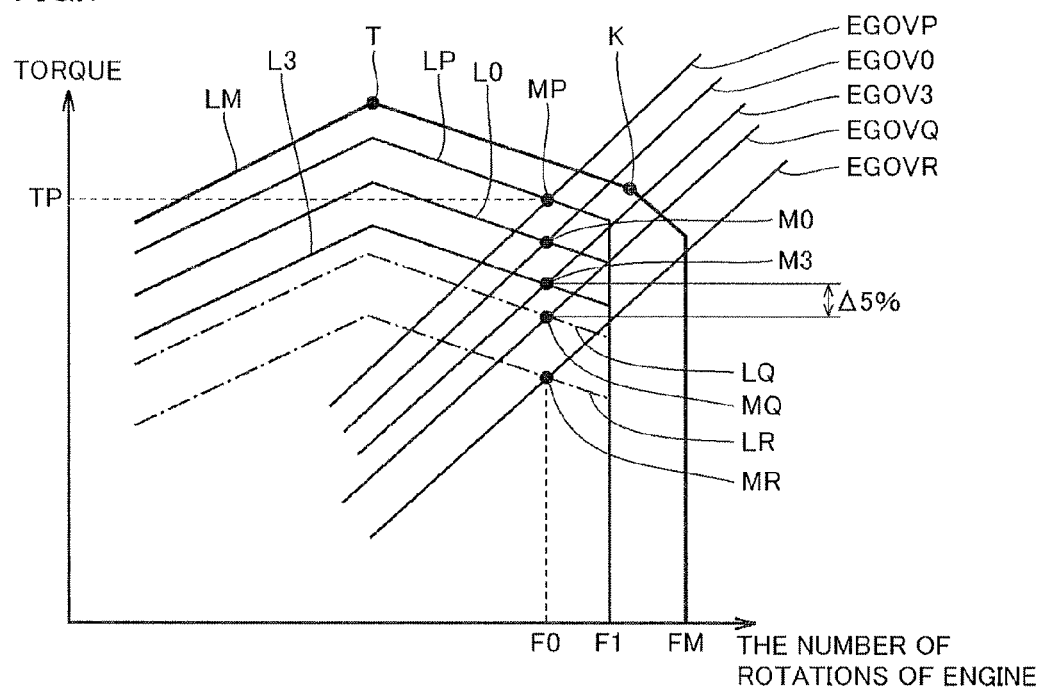
FIG. 7 is a diagram illustrating an engine output torque curve based on the embodiment.

FIG. 7 is a diagram illustrating an engine output torque curve based on the embodiment.

As shown in FIG. 7, an engine output torque curve is set in correspondence with each mode.

Here, the ordinate represents torque and the abscissa represents the number of rotations of the engine.

An engine output torque curve LM is a maximum engine output torque curve defined in accordance with characteristics of engine 36, and it has a maximum number of rotations FM, a maximum torque point T, and a rated point K (a maximum horsepower point). An engine output torque curve defines a torque value of the engine based on the number of rotations of the engine.

An engine output torque curve LP is set in the P mode (power mode).

Engine output torque curves L0 and L3 are set in the E0 and E3 (economy modes) modes, respectively. Engine output torque curves in the E1 and E2 modes can be provided between engine output torque curves L0 and L3, by way of example.

In the present example, the engine output torque curves are set such that horsepower lowers in a stepwise manner in accordance with working modes lower in load state. Specifically, as transition to a working mode lower in load state is made, an engine output torque curve lower in torque is set.

Heavy load working in which a load state of work implement 4 is high means working in which an operation such as revolution at a high speed is repeated while a large amount of load such as soil is held in bucket 7, and means working requiring high horsepower as engine output. Light load working in which a load state of work implement 4 is low means working only of excavation alone or working in which an operation to revolve while load such as soil is held in bucket 7 is intermittently performed, and means working which can be carried out while engine output is suppressed.

For the hydraulic pump (for example, first hydraulic pump 31A), a pump absorption torque characteristic line shown with a line denoted as EGOVP is set. Here, a pump absorption torque characteristic line is set as a monotonously increasing function having the number of rotations of the engine as a variable. Output torque of engine 36 and absorption torque of the hydraulic pump are matched at output torque point MP (matching), and maximum horsepower of engine 36 at output torque point MP is absorbed by the hydraulic pump (for example, first hydraulic pump 31A), so that heavy excavation working can be carried out with high efficiency. Thus, for example, such a control scheme (engine rotation number sensing control) that, while an output torque value TP of engine 36 and the number of rotations of the engine F0 at output torque point MP are defined as target values and a difference between the target number of rotations and the actual number of rotations of the engine is calculated, absorption torque of the hydraulic pump is increased and decreased so as to match output torque of the engine and absorption torque of the hydraulic pump to each other at output torque point MP is a technique which has already been known, detailed description thereof will not be provided.

A pump absorption torque characteristic line is provided for each engine torque output curve. In the present example, pump absorption torque characteristic lines EGOVP, EGOV0, and EGOV3 are provided in correspondence with engine output torque curves LP, L0, and L3, respectively. Based on an engine output torque curve and a pump absorption torque characteristic line corresponding to a working mode, maximum absorption torque in that working mode is set.

In the present embodiment, an engine output torque curve is set in accordance with a state of the reducing agent accumulated in reducing agent tank 69. Specifically, when a state of the reducing agent accumulated in reducing agent tank 69 does not satisfy the reference, an engine output torque curve is set to an engine output torque curve LQ or LR lower in horsepower than engine output torque curve L3 corresponding to the E3 mode which is the working mode lowest in load state. More specifically, when an amount of liquid of the reducing agent in reducing agent tank 69 is equal to or smaller than a prescribed amount, an engine output torque curve is set to one of engine output torque curves LQ and LR. Engine output torque curves LQ and LR are torque curves lower in horsepower with engine output torque curve L3 being defined as the reference. Low horsepower means that, when two engine output torque curves are compared with each other, horsepower in one is lower than in the other when the number of rotations of the engine is the same. Pump absorption torque characteristic lines EGOVQ and EGOVR are provided in correspondence with engine output torque curves LQ and LR, respectively.

In the present example, engine output torque curves LP, L0, and L3 are also referred to as normal-operation engine output torque curves because they are engine output torque curves set in accordance with working modes. Engine output torque curves LQ and LR are also referred to as restricted-operation engine output torque curves because they are set to be lower in horsepower output from the engine than the normal-operation engine output torque curves set in accordance with working modes. Pump absorption torque characteristic lines EGOVQ and EGOVR are also referred to as restricted-operation pump absorption torque characteristic lines because they are set to be lower in maximum absorption torque of the hydraulic pump than pump absorption torque characteristic lines EGOVP, EGOV0, and EGOV3 set in accordance with working modes.

Engine output torque curve LQ is set, for example, to be lower in horsepower by 5% with engine output torque curve L3 being defined as the reference. Specifically, engine output torque curve LQ is set to be lower in torque value by 5% than engine output torque curve L3 at the same number of rotations (for example, the number of rotations of the engine F0). Since horsepower is defined as the number of rotations of the engine×a torque value×a constant, horsepower at an output torque point MQ is lower by 5% than horsepower at an output torque point M3.

Though a case that engine output torque curve LQ is set to be lower in torque value by 5% at the same number of rotations has been described in the present example, horsepower may be lowered by lowering the number of rotations of the engine, without limited to a torque value. In the present example, engine output torque curve LQ lower in at least one of the number of rotations of the engine and torque such that horsepower is lower, with engine output torque curve L3 being defined as the reference, is set.

According to the above, engine output control unit 54 in the present embodiment changes an engine output torque curve set in correspondence with a working mode, based on a result of output from state determination portion 52. Specifically, when state determination portion 52 determines that an amount of liquid of the reducing agent stored in reducing agent tank 69 is equal to or smaller than a prescribed amount, engine output control unit 54 performs first derate processing in which the engine is controlled to low output. Here, the first derate processing refers to processing for setting an engine output torque curve to be set, to an engine output torque curve lower in horsepower than an engine output torque curve corresponding to a working mode lowest in load state among a plurality of working modes. Specifically, output of the engine is controlled with the use of engine output torque curve LQ lower in horsepower with engine output torque curve L3 being defined as the reference.

Engine output control unit 54 notifies pump output control unit 56 of change to first derate processing, and pump output control unit 56 obtains pump absorption torque characteristic line EGOVQ stored in memory 55 and controls absorption torque of the hydraulic pump with the use of pump absorption torque characteristic line EGOVQ. Specifically, pump output control unit 56 instructs swash plate drive apparatus 32 to control the hydraulic pump (for example, first hydraulic pump 31A) in accordance with obtained pump absorption torque characteristic line EGOVQ.

In the present embodiment, in engine control, through the first derate processing, engine output torque curve LQ lower in horsepower than engine output torque curve L3 corresponding to the lowest working mode is set. Thus, in a work vehicle, in working in any working mode, an engine output torque curve lower in horsepower than in the lowest working mode is set so that an operator who operates a work vehicle can readily be informed of lowering in horsepower.

Thus, the operator can be informed that engine output is restricted and a low output state is established, and sufficiently urged to do maintenance such as replenishment with a reducing agent.

By restricting engine output, emission of an exhaust gas containing a nitrogen oxide (NOx) into the air can be suppressed.

Though a case that setting of an engine output torque curve for lowering horsepower by 5% through the first derate processing is made has been described in the present example, limitation to 5% is not particularly intended. Any range may be set so long as horsepower can be lowered to such an extent that an operator who operates a work vehicle can generally sense lowering in horsepower. For example, an engine output torque curve capable of achieving lowering by 5 to 15% and preferably approximately by 5 to 10% can be set.

In the present embodiment, engine output control unit 54 further changes an engine output torque curve set in the first derate processing, based on a result of output from state determination portion 52. Specifically, when state determination portion 52 determines that an amount of liquid of the reducing agent stored in reducing agent tank 69 is equal to or smaller than a prescribed lower amount, engine output control unit 54 performs second derate processing for controlling the engine to low output. Here, the second derate processing refers to processing for setting an engine output torque curve lower in horsepower with the engine output torque curve set in the first derate processing being defined as the reference. Specifically, output of the engine is controlled with the use of engine output torque curve LR lower in horsepower with engine output torque curve LQ being defined as the reference.

Engine output control unit 54 notifies pump output control unit 56 of change to second derate processing, and pump output control unit 56 obtains pump absorption torque characteristic line EGOVR stored in memory 55 and controls absorption torque of the hydraulic pump with the use of pump absorption torque characteristic line EGOVR. Specifically, pump output control unit 56 instructs swash plate drive apparatus 32 to control the hydraulic pump (for example, first hydraulic pump 31A) in accordance with obtained pump absorption torque characteristic line EGOVR. A maximum absorption torque value in this case is set to an output torque point MR.

In the present embodiment, in engine control, through the second derate processing, setting to engine output torque curve LR lower in horsepower than in the first derate processing is made. Thus, in the work vehicle, in working in any working mode, an engine output torque curve lower in horsepower is set so that an operator who operates a work vehicle can more readily be informed of lowering in horsepower.

Thus, the operator can be informed that engine output is restricted and a low output state is established, and sufficiently urged to do maintenance such as replenishment with a reducing agent.

By further restricting engine output, emission of an exhaust gas containing a nitrogen oxide (NOx) into the air can further be suppressed.

A flow of the processing above will be described below.

<Flow Processing>

Figure 8:
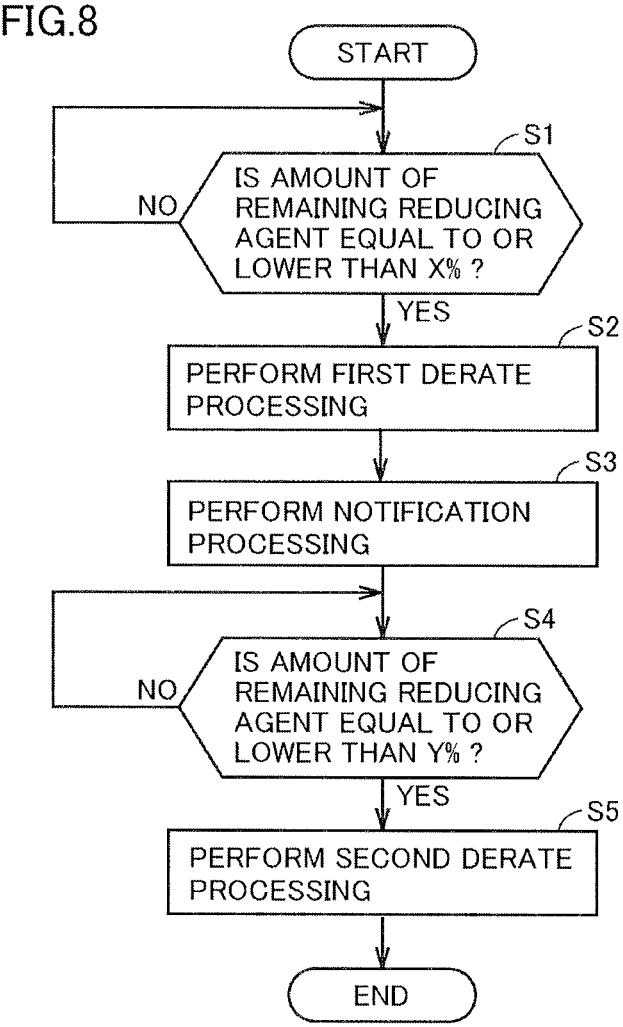
FIG. 8 is a flowchart illustrating derate processing in main controller 50 of work vehicle 101 based on the embodiment.

FIG. 8 is a flowchart illustrating derate processing in main controller 50 of work vehicle 101 based on the embodiment. In the present example, derate processing in accordance with lowering in remaining amount of the reducing agent is described.

As shown in FIG. 8, whether or not a remaining amount of the reducing agent is equal to or lower than X % is determined (step S1). Specifically, state determination portion 52 determines whether or not a remaining amount of the reducing agent is equal to or lower than X %, based on a result of detection of an amount of liquid of the reducing agent from sensor 91. X % is a value set in consideration of a condition that it is necessary to notify an operator of replenishment with the reducing agent when a remaining amount of the reducing agent lowers, and a person skilled in the art could set an appropriate value as appropriate.

When it is determined in step S1 that a state in step S1 is maintained until the remaining amount of the reducing agent is equal to or lower than X % and the remaining amount of the reducing agent is equal to or lower than X %, first derate processing is performed (step S2). Specifically, state determination portion 52 gives an instruction to that effect to engine output control unit 54, and engine output control unit 54 sets engine output torque curve LQ. Engine output control unit 54 gives an instruction to pump output control unit 56, and pump output control unit 56 sets and instructs swash plate drive apparatus 32 to control the hydraulic pump (for example, first hydraulic pump 31A) in accordance with pump absorption torque characteristic line EGOVQ. A maximum absorption torque value in this case is set to output torque point MQ.

Then, notification processing is performed (step S3). Specifically, engine output control unit 54 gives an instruction to notification portion 53, and notification portion 53 notifies an operator of guidance information. Contents of the guidance information will be described later.

Then, whether or not a remaining amount of the reducing agent is equal to or lower than Y % is determined (step S4). Specifically, state determination portion 52 determines whether or not a remaining amount of the reducing agent is equal to or lower than Y % (X>Y), based on a result of detection of an amount of liquid of the reducing agent from sensor 91. Y % is a value set in consideration of a condition that it is necessary to notify an operator of replenishment with the reducing agent when a remaining amount of the reducing agent lowers, and a person skilled in the art could set an appropriate value as appropriate.

When it is determined in step S4 that a state in step S4 is maintained until the remaining amount of the reducing agent is equal to or lower than Y % and the remaining amount of the reducing agent is equal to or lower than Y %, second derate processing is performed (step S5). Specifically, state determination portion 52 gives an instruction to that effect to engine output control unit 54, and engine output control unit 54 sets engine output torque curve ER. Engine output control unit 54 gives an instruction to pump output control unit 56, and pump output control unit 56 sets and instructs swash plate drive apparatus 32 to control the hydraulic pump (for example, first hydraulic pump 31A) in accordance with pump absorption torque characteristic line EGOVR. A maximum absorption torque value in this case is set to output torque point MR.

Then, the process ends (end).

Though derate processing in accordance with lowering in remaining amount of the reducing agent based on sensor 91 has been described in the present example, similar derate processing can also be performed in a case of lowering in quality of the reducing agent based on sensor 91, without particularly limited to lowering in remaining amount of the reducing agent.

Similar derate processing can be performed based on a state of an exhaust gas purification apparatus from sensors 92 and 93, without limited to derate processing based on a state of the reducing agent from sensor 91. Specifically, when state determination portion 52 detects an abnormal condition of reducing agent injection valve 68 from sensor 92, it outputs that state to engine output control unit 54. The first derate processing and the second derate processing can be performed in response to an instruction from state determination portion 52.

When state determination portion 52 detects an abnormal condition of EGR 61 from sensor 93, it outputs that state to engine output control unit 54. The first derate processing and the second derate processing can be performed in response to an instruction from state determination portion 52.

Unless an abnormal condition is detected in a stepwise manner, second derate processing may be performed, with first derate processing being skipped.

<Guidance Display>

Figure 9:
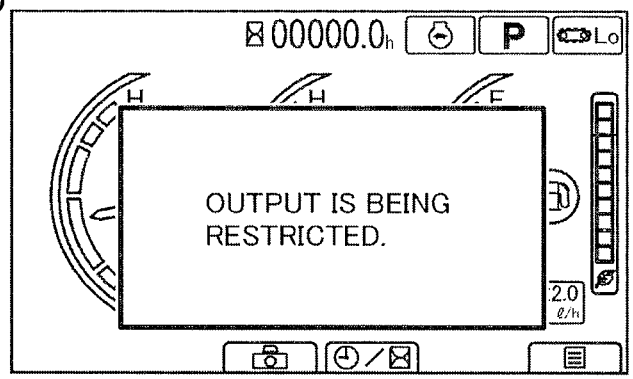
FIG. 9 is a diagram illustrating one example of guidance information displayed on monitor apparatus 21 based on the embodiment.

FIG. 9 is a diagram illustrating one example of guidance information displayed on monitor apparatus 21 based on the embodiment.

FIG. 9 shows notification of guidance information on display portion 212 of monitor apparatus 21. Specifically, guidance "output is being restricted." is displayed as a message. In the present example, notification portion 53 gives guidance information while first derate processing is performed in response to an instruction from engine output control unit 54.

By notifying an operator of guidance information, the operator can readily be informed that engine output is actually lowered and output as current engine output is being restricted.

Though a case that a message is displayed on display portion 212 as guidance information has been described in the present example, limitation thereto is not particularly intended and the message may be output through voice and sound. Alternatively, an icon associated with a message can be displayed for giving the operator guidance information. Alternatively, as a notification scheme, processing for vibrating monitor apparatus 21 by making use of a vibration function or causing display on display portion 212 to blink by making use of a light emission function or the like can also be performed.

Contents of a message are not limited to the above, and any contents can be accepted so long as the contents encourage replenishment with a reducing agent. Alternatively, information on what kind of maintenance or services is required can also be given. For example, a case that an amount of liquid of the reducing agent stored in reducing agent tank 69 is lowered based on a result of sensing by sensor 91 would fall under such a state, and notification of the fact that replenishment with a reducing agent is necessary may be given. Alternatively, when a state of the exhaust gas purification apparatus (for example, a state of reducing agent injection valve 68) is in an abnormal condition based on a result of sensing from sensors 92 and 93, notification of the fact that such a state is established and maintenance is necessary can be given.

Though a scheme for giving notification while first derate processing is performed has been described in the present example, maintenance such as replenishment with a reducing agent may further be encouraged by changing contents of notification during second derate processing.

Though a hydraulic excavator has been described by way of example of a work vehicle, application also to such a work vehicle as a bulldozer or a wheel loader is possible, and application to any work machine provided with engine 36 is possible.

(Variation)

Though a case that an operator is readily informed of lowering in horsepower by setting engine output torque curve LQ or LR lower in horsepower than engine output torque curve L3 corresponding to the lowest working mode through the first and second derate processing in connection with engine control has been described in the embodiment above, a pump can also be controlled in accordance with a similar scheme.

In the present variation, in connection with pump control, through the first and second derate processing, pump absorption torque characteristic line EGOVQ or EGOVR lower in maximum absorption torque of the hydraulic pump than pump absorption torque characteristic line EGOV3 corresponding to the lowest working mode is set. Thus, in a work vehicle, in working in any working mode, a pump absorption torque characteristic line lower in maximum absorption torque than in the lowest working mode is set so that an operator who operates a work vehicle can readily be informed of lowering in horsepower.

Though the embodiment of the present invention has been described above, it should be understood that the embodiment disclosed herein is illustrative and non-restrictive in every respect. The scope of the present invention is defined by the terms of the claims, and is intended to include any modifications within the scope and meaning equivalent to the terms of the claims.

REFERENCE SIGNS LIST 1 lower carrier; 2 revolving mechanism; 3 upper revolving unit; 4 work implement; 5 boom; 6 arm; 7 bucket; 8 operator's cab; 9 operator's seat; 10 travel operation portion; 11, 12 travel lever; 13, 14 travel pedal; 15 pedal for attachment; 16 side window; 17 dashboard; 18, 19 work implement lever; 20 locking lever; 21 monitor apparatus; 22 front window; 23 vertical frame; 31A first hydraulic pump; 31B second hydraulic pump; 32 swash plate drive apparatus; 34 control valve; 35 hydraulic actuator; 36 engine; 38 engine controller; 39 fuel dial; 40 rotation sensor; 41 work implement lever apparatus; 42 pressure switch; 43 valve; 45 potentiometer; 46 starter switch; 47 pressure sensor; 50 main controller; 51 mode determination portion; 52 state determination portion; 53 notification portion; 54 engine output control unit; 55 memory; 56 pump output control unit; 60 exhaust gas purification apparatus; 61 EGR; 62 exhaust purification unit; 62A diesel oxidation catalyst apparatus; 62B diesel particulate filter apparatus; 64 mixing piping; 65 selective catalytic reduction apparatus; 66 flue; 68 reducing agent injection valve; 69 reducing agent tank; 82 reducing agent supply pump; 84 reducing agent injector; 91 to 93 sensor; 101 work vehicle; 111 deceleration switch; 112 working mode selection switch; 113 travel speed gear selection switch; 114 buzzer cancellation switch; 115 wiper switch; 116 washer switch; 117 air-conditioner switch; 211 input portion; 212 display portion; and 213 display control unit.

The invention claimed is:

1. A work vehicle, comprising:
a selector for selecting a working mode among a plurality of working modes allowing working in accordance with a load state;
an engine;
an exhaust gas purification apparatus for purifying a nitrogen oxide in an exhaust gas emitted from said engine;
a reducing agent tank for storing a reducing agent to be supplied to said exhaust gas purification apparatus;
a state determination portion for determining a state of said reducing agent stored in said reducing agent tank; and
an engine control unit configured to control output of said engine in accordance with a state of said reducing agent determined by said state determination portion,
said engine control unit configured to control output of said engine based on a restricted-operation engine output torque curve in which horsepower output from the engine is lower than horsepower output from the engine at time when each of said plurality of working modes is selected by the selector, when a state of said reducing agent is equal to or lower than a reference value.

2. The work vehicle according to claim 1, wherein said state determination portion determines a concentration of said reducing agent as the state of said reducing agent.

3. The work vehicle according to claim 1, further comprising:
a work implement;
a hydraulic actuator for driving said work implement;
a hydraulic pump for supplying hydraulic oil to said hydraulic actuator as said engine is driven; and
a pump control unit for controlling absorption torque of said hydraulic pump,
said pump control unit setting maximum absorption torque based on said restricted-operation engine output torque curve and a restricted pump absorption torque characteristic line set when the state of said reducing agent is equal to or lower than the reference value.

4. The work vehicle according to claim 1, wherein said restricted-operation engine output torque curve is lower in at least one of a maximum number of rotations of the engine and torque than a normal-operation engine output torque curve set at the time when each of said plurality of working modes is selected.

5. The work vehicle according to claim 1, wherein said restricted-operation engine output torque curve is set to be lower in horsepower by 5% or more than horsepower in accordance with a normal-operation engine output torque curve set at the time when each of said plurality of working modes is selected.

6. The work vehicle according to claim 1, further comprising a notification portion for giving notification of a result of determination by said state determination portion.

* * * * *